United States Patent
Wang et al.

(10) Patent No.: US 10,187,708 B2
(45) Date of Patent: Jan. 22, 2019

(54) DATA PROCESSING METHOD AND APPARATUS

(71) Applicant: Huawei Technologies Co., Ltd., Shenzhen (CN)

(72) Inventors: Xinyuan Wang, Beijing (CN); Zhenyang Qian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/393,348

(22) Filed: Dec. 29, 2016

(65) Prior Publication Data
US 2017/0111718 A1  Apr. 20, 2017

Related U.S. Application Data

(63) Continuation of application No. PCT/CN2014/081213, filed on Jun. 30, 2014.

(51) Int. Cl.
*H04Q 11/00* (2006.01)
*H04L 12/935* (2013.01)

(52) U.S. Cl.
CPC ........ *H04Q 11/0005* (2013.01); *H04L 49/30* (2013.01); *H04Q 11/00* (2013.01); *H04Q 2011/0086* (2013.01)

(58) Field of Classification Search
CPC ........ H04Q 11/0005; H04Q 2011/0086; H04L 49/30
See application file for complete search history.

(56) References Cited

U.S. PATENT DOCUMENTS

| 7,840,692 B1 * | 11/2010 | Monga | H04L 41/00 370/386 |
| 8,089,993 B2 | 1/2012 | Wei et al. | |
| 2011/0229126 A1 * | 9/2011 | Gerstel | H04L 41/0896 398/25 |

FOREIGN PATENT DOCUMENTS

| CN | 101192949 A | 6/2008 |
| CN | 101207489 A | 6/2008 |

(Continued)

OTHER PUBLICATIONS

International Telecommunication Union, Series G: Transmission Systems and Media, Digital Systems and Networks, Transmission Media and Optical Systems Characteristics—Characteristics of Optical Systems, "Spectral Grids for WDM Applications: DWDM Frequency Grid," ITU-T G.694.1, (Feb. 2012), 16 pages.

*Primary Examiner* — Leslie C Pascal
(74) *Attorney, Agent, or Firm* — Slater Matsil, LLP

(57) ABSTRACT

A line card is provided. The line card includes: a first processing module, configured to determine, according to a correspondence between a first optical serial signal flow and a logical interface, the logical interface, where bandwidth of the logical interface is configured to be first bandwidth, the logical interface is corresponding to a first optical interface, and the first optical interface is corresponding to an optical fiber, or a channel that is in an optical fiber and is used to transmit an optical signal with a wavelength. The line card also includes a second processing module, configured to determine, according to a correspondence between the logical interface and the first optical interface and the logical interface, the first optical interface. The line card also includes a scheduling module, configured to transmit the first optical serial signal flow through the first optical interface.

10 Claims, 2 Drawing Sheets

---

S201 A line card determines, according to a correspondence between a first optical serial signal flow and a logical interface, the logical interface corresponding to the first optical serial signal flow

↓

S202 The line card determines, according to a correspondence between the logical interface and a first optical interface, the first optical interface corresponding to the logical interface

↓

S203 The line card transmits the first optical serial signal flow through the first optical interface

(56) References Cited

FOREIGN PATENT DOCUMENTS

| | | | |
|---|---|---|---|
| CN | 101207490 | A | 6/2008 |
| CN | 101207491 | A | 6/2008 |
| CN | 101583054 | A | 11/2009 |
| CN | 102143006 | A | 8/2011 |
| EP | 2670082 | A1 | 12/2013 |
| WO | 2012003890 | A1 | 1/2012 |

* cited by examiner

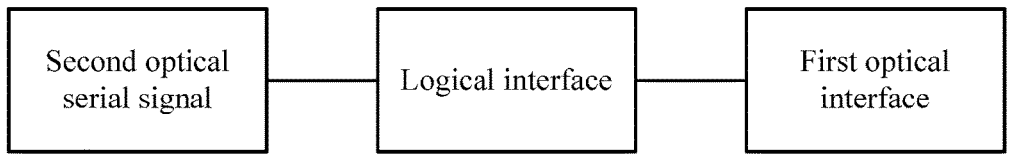

FIG. 4

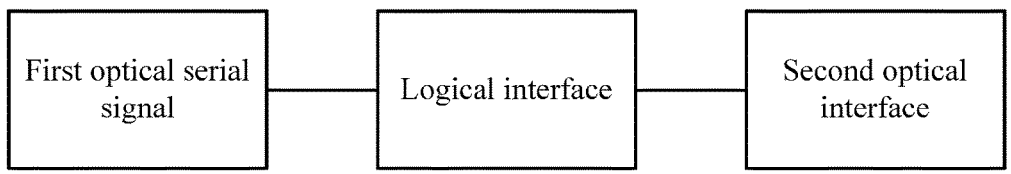

FIG. 5

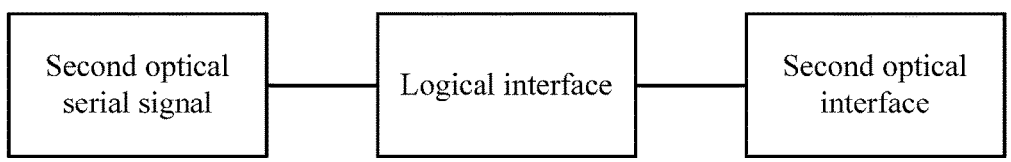

FIG. 6

S201 A line card determines, according to a correspondence between a first optical serial signal flow and a logical interface, the logical interface corresponding to the first optical serial signal flow

S202 The line card determines, according to a correspondence between the logical interface and a first optical interface, the first optical interface corresponding to the logical interface

S203 The line card transmits the first optical serial signal flow through the first optical interface

FIG. 7

DATA PROCESSING METHOD AND APPARATUS

CROSS-REFERENCE TO RELATED APPLICATIONS

This application is a continuation of International Application No. PCT/CN2014/081213, filed on Jun. 30, 2014, the disclosure of which is hereby incorporated by reference in its entirety.

TECHNICAL FIELD

The present invention relates to the communications field, and in particular, to a data processing method and apparatus.

BACKGROUND

As a part of a network switch, a router, or another network device, a line card (LC for short) can be used to connect a cable or an optical fiber.

In the prior art, a line card generates an optical bit stream, and then outputs the generated optical bit stream by using an optical fiber. Bandwidth of an optical fiber is a fixed value. For example, bandwidth of an optical fiber is 40 gigabits per second (Gb/s for short) or 100 Gb/s. Bandwidth of the optical bit stream output by the optical fiber is a fixed value. The foregoing technical solution is difficult to be applied to a flexible Ethernet.

SUMMARY

Embodiments of the present invention provide a data processing method and apparatus. The technical solutions are helpful to be applied to a flexible Ethernet.

According to a first aspect, a data processing apparatus is provided, where the apparatus is implemented by using a line card. The line card includes: a first processing module, configured to determine, according to a correspondence between a first optical serial signal flow and a logical interface, the logical interface corresponding to the first optical serial signal flow, where bandwidth of the logical interface is configured to be first bandwidth, bandwidth of the first optical serial signal flow is less than or equal to the first bandwidth, the logical interface is corresponding to a first optical interface, and the first optical interface is corresponding to an optical fiber, or a channel that is in an optical fiber and is used to transmit an optical signal with a wavelength. The line card also includes a second processing module, configured to determine, according to a correspondence between the logical interface and the first optical interface and the logical interface that is determined by the first processing module, the first optical interface corresponding to the logical interface. The line card also includes a scheduling module, configured to transmit the first optical serial signal flow through the first optical interface determined by the second processing module.

With reference to the first aspect, in a first possible implementation manner of the first aspect, the first processing module is further configured to: modify the correspondence between the first optical serial signal flow and the logical interface to a correspondence between a second optical serial signal flow and the logical interface, where bandwidth of the second optical serial signal flow is less than or equal to the first bandwidth; and determine, according to the correspondence between the second optical serial signal flow and the logical interface, the logical interface corresponding to the second optical serial signal flow; and the scheduling module is further configured to transmit the second optical serial signal flow through the first optical interface determined by the second processing module.

With reference to the first possible implementation manner of the first aspect, in a second possible implementation manner of the first aspect, the first processing module is further configured to modify the bandwidth of the logical interface to second bandwidth, where the bandwidth of the second optical serial signal flow is less than or equal to the second bandwidth.

With reference to the first aspect, in a third possible implementation manner of the first aspect, the second processing module is further configured to: modify the correspondence between the logical interface and the first optical interface to a correspondence between the logical interface and a second optical interface; and determine, according to the correspondence between the logical interface and the second optical interface, the second optical interface corresponding to the logical interface; the scheduling module is further configured to: transmit the first optical serial signal flow through the second optical interface determined by the second processing module.

With reference to the third possible implementation manner of the first aspect, in a fourth possible implementation manner of the first aspect, the second processing module is further configured to modify the bandwidth of the logical interface to second bandwidth, where the bandwidth of the first optical serial signal flow is less than or equal to the second bandwidth.

With reference to the first aspect, in a fifth possible implementation manner of the first aspect, the first processing module is further configured to: modify the correspondence between the first optical serial signal flow and the logical interface to a correspondence between a second optical serial signal flow and the logical interface; and determine, according to the correspondence between the second optical serial signal flow and the logical interface, the logical interface corresponding to the second optical serial signal flow; the second processing module is further configured to: modify the correspondence between the logical interface and the first optical interface to a correspondence between the logical interface and a second optical interface; and determine, according to the correspondence between the logical interface and the second optical interface and the logical interface that is determined by the first processing module, the second optical interface corresponding to the logical interface; and the scheduling module is further configured to: transmit the second optical serial signal flow through the second optical interface determined by the second processing module.

With reference to the fifth possible implementation manner of the first aspect, in a sixth possible implementation manner of the first aspect, the first processing module or the second processing module is further configured to: modify the bandwidth of the logical interface to second bandwidth, where bandwidth of the second optical serial signal flow is less than or equal to the second bandwidth.

With reference to the first aspect, in a seventh possible implementation manner of the first aspect, the first processing module or the second processing module is further configured to: modify the bandwidth of the logical interface to second bandwidth, where the bandwidth of the first optical serial signal flow is less than or equal to the second bandwidth.

According to second aspect, a data processing method is provided. The method includes: determining, by a line card according to a correspondence between a first optical serial signal flow and a logical interface, the logical interface corresponding to the first optical serial signal flow, where bandwidth of the logical interface is configured to be first bandwidth, bandwidth of the first optical serial signal flow is less than or equal to the first bandwidth, the logical interface is corresponding to a first optical interface, and the first optical interface is corresponding to an optical fiber, or a channel that is in an optical fiber and is used to transmit an optical signal with a wavelength. The method also includes determining, by the line card according to a correspondence between the logical interface and the first optical interface, the first optical interface corresponding to the logical interface. The method also includes transmitting, by the line card, the first optical serial signal flow through the first optical interface.

According to the second aspect, in a first possible implementation manner of the second aspect, the method further includes: modifying, by the line card, the correspondence between the first optical serial signal flow and the logical interface to a correspondence between a second optical serial signal flow and the logical interface, where bandwidth of the second optical serial signal flow is less than or equal to the first bandwidth. The method also includes determining, by the line card according to the correspondence between the second optical serial signal flow and the logical interface, the logical interface corresponding to the second optical serial signal flow. The method also includes transmitting, by the line card, the second optical serial signal flow through the first optical interface.

With reference to the first possible implementation manner of the second aspect, in a second possible implementation manner of the second aspect, the method further includes: modifying, by the line card, the bandwidth of the logical interface to second bandwidth, where the bandwidth of the second optical serial signal flow is less than or equal to the second bandwidth.

According to the second aspect, in a third possible implementation manner of the second aspect, the method further includes: modifying, by the line card, the correspondence between the logical interface and the first optical interface to a correspondence between the logical interface and a second optical interface; determining, by the line card according to the correspondence between the logical interface and the second optical interface, the second optical interface corresponding to the logical interface; and transmitting, by the line card, the first optical serial signal flow through the second optical interface.

With reference to the third possible implementation manner of the second aspect, in a fourth possible implementation manner of the second aspect, the method further includes: modifying, by the line card, the bandwidth of the logical interface to second bandwidth, where the bandwidth of the first optical serial signal flow is less than or equal to the second bandwidth.

According to the second aspect, in a fifth possible implementation manner of the second aspect, the method further includes: modifying, by the line card, the correspondence between the first optical serial signal flow and the logical interface to a correspondence between a second optical serial signal flow and the logical interface; modifying, by the line card, the correspondence between the logical interface and the first optical interface to a correspondence between the logical interface and a second optical interface; determining, by the line card according to the correspondence between the second optical serial signal flow and the logical interface, the logical interface corresponding to the second optical serial signal flow; determining, by the line card according to the correspondence between the logical interface and the second optical interface, the second optical interface corresponding to the logical interface; and transmitting, by the line card, the second optical serial signal flow through the second optical interface.

With reference to the fifth possible implementation manner of the second aspect, in a sixth possible implementation manner of the second aspect, the method further includes: modifying, by the line card, the bandwidth of the logical interface to second bandwidth, where bandwidth of the second optical serial signal flow is less than or equal to the second bandwidth.

According to the second aspect, in a seventh possible implementation manner of the second aspect, the method further includes: modifying, by the line card, the bandwidth of the logical interface to second bandwidth, where the bandwidth of the first optical serial signal flow is less than or equal to the second bandwidth.

In the embodiments of the present invention, a first optical serial signal flow is corresponding to a logical interface, and the logical interface is corresponding to a first optical interface. An optical interface used to output the first optical serial signal flow may be determined according to a correspondence between the first optical serial signal flow and the logical interface and a correspondence between the logical interface and the first optical interface. Therefore, at least one of the foregoing two correspondences may be modified to change an optical serial signal flow that is output by an optical interface or change an optical interface that is used to output an optical serial signal flow. Therefore, the foregoing technical solution may be better applied to a flexible Ethernet.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 3 to FIG. 6 are schematic diagrams of correspondences between a logical interface, an optical serial signal, and an optical interface according to an embodiment of the present invention; and FIG. 7 is a schematic flowchart of a data processing method according to an embodiment of the present invention.

DETAILED DESCRIPTION OF ILLUSTRATIVE EMBODIMENTS

To make the objectives, technical solutions, and advantages of the present invention clearer, the following further describes the present invention in detail with reference to the accompanying drawings. Apparently, the described embodiments are merely some rather than all of the embodiments of the present invention. All other embodiments obtained by a person of ordinary skill in the art based on the embodiments of the present invention without creative efforts shall fall within the protection scope of the present invention.

Figure 1:
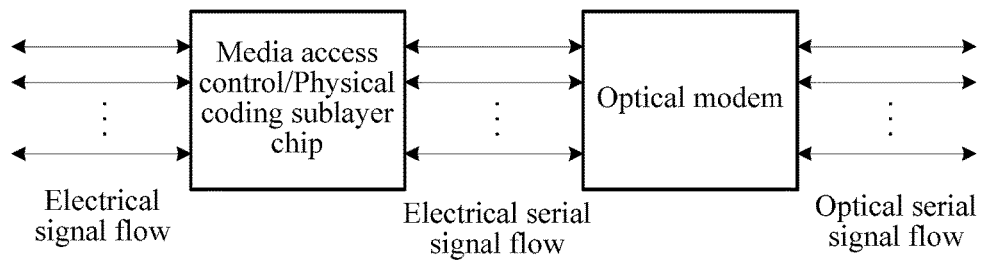
FIG. 1 is a schematic structural diagram of a data channel of a line card in a router in the prior art.

As mentioned above, a line card is a part of a network switch, a router, or another network device. The line card may be configured to connect a cable or an optical fiber. The line card may exist in a high-end router based on a distributed architecture. The line card may include a data channel and a control channel, where the control channel may be configured to implement configuration, management, and state information processing, and the data channel may be configured to implement forwarding processing on a packet. FIG. 1 is a schematic structural diagram of a data channel of an LC in a router. As shown in FIG. 1, the line card includes a media access control (MAC for short)/physical coding sublayer (PCS) chip and an optical modem (or referred to as an optical module). The MAC/PCS chip may be implemented by using an application-specific integrated circuit (ASIC for short) chip. An ASIC chip configured to implement a MAC/PCS function receives an electrical signal flow, performs coding, scrambling, and channel distribution processing on the received electrical signal flow, and generates an electrical serial signal flow. The electrical signal flow may be output by a network processor (NP for short) or a traffic management chip. The electrical serial signal flow may also be referred to as a SerDes (serializer/deserializer) signal flow. The optical modem modulates an electrical serial signal flow into an optical serial signal flow, and outputs the optical serial signal flow through an optical interface between the optical modem and an optical fiber, where the optical interface may be an optical fiber, or a channel that is in an optical fiber and is used to transmit an optical signal with a wavelength.

It may be seen that, the line card can modulate the received electrical signal flow into the electrical serial signal flow, performs modulation on the electrical serial signal flow, and outputs the optical serial signal flow by using an optical fiber.

The line card in this embodiment of the present invention may be configured to implement the foregoing functions. In addition, the line card may be applied to data processing of a flexible Ethernet.

Figure 2:
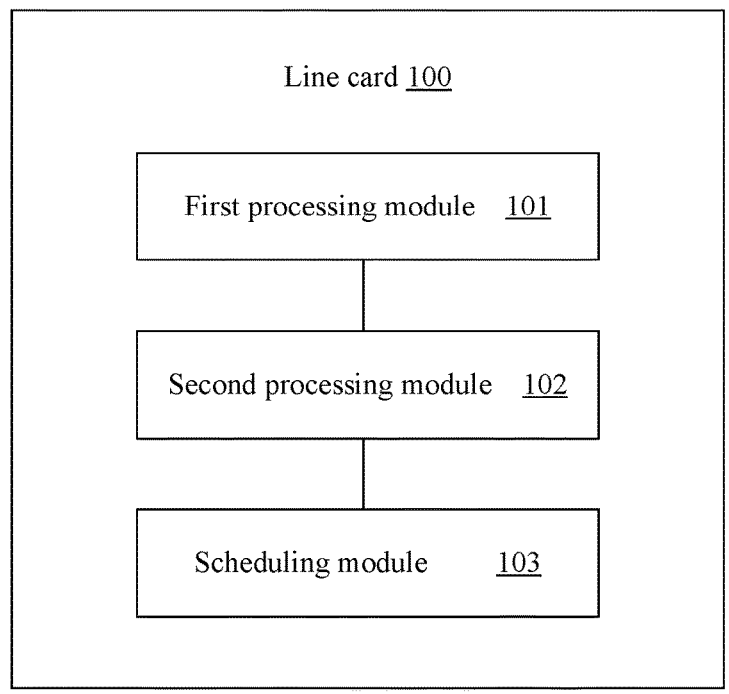
FIG. 2 is a schematic structural diagram of a data processing apparatus according to an embodiment of the present invention.

Referring to FIG. 2, FIG. 2 is a schematic structural diagram of a data processing apparatus according to an embodiment of the present invention. Referring to FIG. 2, the apparatus is implemented by using a line card 100. The line card 100 includes: a first processing module 101, a second processing module 102, and a scheduling module 103.

The first processing module 101 is configured to determine, according to a correspondence between a first optical serial signal flow and a logical interface, the logical interface corresponding to the first optical serial signal flow, where bandwidth of the logical interface is configured to be first bandwidth, bandwidth of the first optical serial signal flow is less than or equal to the first bandwidth, the logical interface is corresponding to a first optical interface, and the first optical interface is corresponding to an optical fiber, or a channel that is in an optical fiber and is used to transmit an optical signal with a wavelength.

The second processing module 102 is configured to determine, according to a correspondence between the logical interface and the first optical interface and the logical interface that is determined by the first processing module 101, the first optical interface corresponding to the logical interface.

The scheduling module 103 is configured to transmit the first optical serial signal flow through the first optical interface determined by the second processing module 102.

Specifically, the first processing module 101 and the second processing module 102 may be implemented by using a logical circuit, or may be implemented in a form of software. The scheduling module 103 may be implemented by using a logical circuit, for example, by using a programmable gate array (FPGA for short), or may be implemented in a form of software. When the first processing module 101, the second processing module 102, or the scheduling module 103 are implemented in a form of software, it may be specifically that the line card 100 includes a processor and a memory, where the processor is coupled to the memory; the memory includes a computer program; the processor implements a function of the first processing module 101, the second processing module 102, or the scheduling module 103 by executing the computer program; and the processor may be a central processing unit (CPU for short) or an NP.

Specifically, the line card 100 or a network device including the line card boo may store a first correspondence table that is used to store the correspondence between the first optical serial signal flow and the logical interface; and may further store a second correspondence table that is used to store the correspondence between the logical interface and the first optical interface. There is a one-to-one correspondence between the logical interface and the first optical interface. The first optical interface is corresponding to an optical fiber, or a channel that is in an optical fiber and is used to transmit an optical signal with a wavelength. For example, the first correspondence table may include an identifier of the first optical serial signal flow and an identifier of the logical interface, and the second correspondence table may include the identifier of the logical interface and an identifier of the first optical interface. The first optical serial signal flow may be sent by a first SerDes, where the line card 100 includes the first SerDes. The identifier of the first optical serial signal flow may be an identifier of the first SerDes. The line card 100 may generate the first correspondence table and the second correspondence table according to a configuration message sent by a network management system or according to a configuration command entered by an engineer by using telnet. The line card 100 may modify the first correspondence table and the second correspondence table according to a configuration message sent by a network management system or according to a configuration command entered by an engineer by using telnet.

The line card 100 may perform configuration on the bandwidth of the logical interface. For example, the line card 100 may perform configuration on the bandwidth of the logical interface according to a configuration message sent by a network management system or according to a configuration command entered by an engineer by using telnet. For example, the bandwidth of the logical interface is configured to be the first bandwidth. The line card 100 may generate configuration information after the bandwidth of the logical interface is configured, where the identifier of the logical interface and a value of the first bandwidth may be stored in the configuration information. One signal flow of the logical interface may be modulated by a MAC/PCS chip in the line card into one or more electrical serial signal flows, and one electrical serial signal flow may be modulated by an optical modem in the line card into one or more optical serial signal flows, where bandwidth of an optical serial signal flow is less than or equal to bandwidth of a corresponding logical interface.

The line card 100 may create the first correspondence table and the second correspondence table when performing configuration on the logical interface, or the line card 100 may adjust the first correspondence table and the second correspondence table when adjusting the logical interface, for example, when adjusting a quantity of logical interfaces or adjusting the bandwidth of the logical interface, to meet a requirement of a flexible Ethernet.

For example, the first processing module 101 or the second processing module 102 may be further configured to modify the bandwidth of the logical interface to second bandwidth, where the bandwidth of the first optical serial signal flow is less than or equal to the second bandwidth. For example, the line card 100 may modify the bandwidth of the logical interface according to a configuration message sent by a network management system or according to a configuration command entered by an engineer by using telnet. Specifically, the bandwidth of the logical interface is modified to the second bandwidth. The line card 100 may modify the configuration information. The identifier of the logical interface and a value of the second bandwidth may be stored in the modified configuration information. The first bandwidth is not equal to the second bandwidth. For example, the first bandwidth may be 25 gigabits per second (Gb/s for short), and the second bandwidth may be 50 Gb/s.

Figure 3:
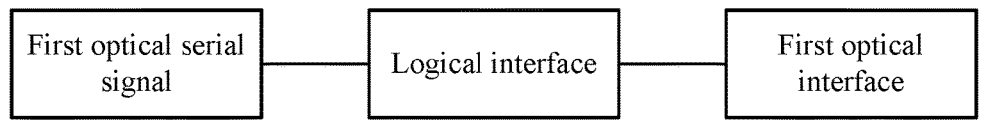

For example, the correspondence between the first optical serial signal flow and the logical interface is stored in the first correspondence table, and the correspondence between the logical interface and the first optical interface is stored in the second correspondence table. The bandwidth of the logical interface is configured to be the first bandwidth, the bandwidth of the first optical serial signal flow is less than or equal to the first bandwidth, the logical interface is corresponding to the first optical interface, and the first optical interface is corresponding to an optical fiber, or a channel that is in an optical fiber and is used to transmit an optical signal with a wavelength. FIG. 3 shows the foregoing correspondences. In this case, the first processing module 101 may determine, according to the correspondence between the first optical serial signal flow and the logical interface, the logical interface corresponding to the first optical serial signal flow, the second processing module 102 may determine, according to the correspondence between the logical interface and the first optical interface, the first optical interface corresponding to the logical interface, and the scheduling module 103 may transmit the first optical serial signal flow through the first optical interface. For example, the wavelength may be 850 nanometers (nm for short), 1310 nm, or 1550 nm.

Preferably, the first processing module 101 may be further configured to: modify the correspondence between the first optical serial signal flow and the logical interface to a correspondence between a second optical serial signal flow and the logical interface, where bandwidth of the second optical serial signal flow is less than or equal to the first bandwidth; and determine, according to the correspondence between the second optical serial signal flow and the logical interface, the logical interface corresponding to the second optical serial signal flow.

The scheduling module 103 is further configured to transmit the second optical serial signal flow through the first optical interface determined by the second processing module 102.

The correspondence between the second optical serial signal flow and the logical interface may be implemented by using, for example, a third correspondence table, where the third correspondence table may include an identifier of the second optical serial signal flow and the identifier of the logical interface. The second optical serial signal flow may be sent by a second SerDes, where the line card 100 includes the second SerDes. The identifier of the second optical serial signal flow may be an identifier of the second SerDes.

Specifically, when a correspondence between a logical interface and an optical serial signal flow needs to be modified, a modification may be implemented by modifying the foregoing first correspondence table.

For example, in the foregoing preferable implementation manner, the first processing module 101 modifies the correspondence between the first optical serial signal flow and the logical interface in the first correspondence table to the correspondence between the second optical serial signal flow and the logical interface, where the bandwidth of the second optical serial signal flow is less than or equal to the first bandwidth. FIG. 4 shows the modified correspondence. In this case, the first processing module 101 may determine, according to the correspondence between the second optical serial signal flow and the logical interface, the logical interface corresponding to the second optical serial signal flow, the second processing module 102 may determine, according to the correspondence between the logical interface and the first optical interface, the first optical interface corresponding to the logical interface, and the scheduling module 103 may transmit the first optical serial signal flow through the first optical interface.

It may be seen that, a correspondence between a logical interface and an optical serial signal flow is modified by modifying the first correspondence table in the foregoing two correspondence tables, to change an optical serial signal flow that is input by an optical interface. Therefore, the foregoing technical solution may be better applied to a flexible Ethernet.

Preferably, when modifying the correspondence between the first optical serial signal flow and the logical interface to the correspondence between the second optical serial signal flow and the logical interface, the first processing module 101 may further modify the bandwidth of the logical interface. Specifically, the first processing module 101 may modify the bandwidth of the logical interface to second bandwidth, where the bandwidth of the second optical serial signal flow is less than or equal to the second bandwidth.

Preferably, the second processing module 102 may be further configured to modify the correspondence between the logical interface and the first optical interface to a correspondence between the logical interface and a second optical interface.

The second processing module 102 may be further configured to determine, according to the correspondence between the logical interface and the second optical interface, the second optical interface corresponding to the logical interface.

The scheduling module 103 may be further configured to transmit the first optical serial signal flow through the second optical interface determined by the second processing module 102.

Specifically, when a correspondence between a logical interface and an optical interface needs to be modified, a modification may be implemented by modifying the foregoing second correspondence table.

For example, in the foregoing preferable implementation manner, the second processing module 102 modifies the correspondence between the first optical interface and the logical interface in the second correspondence table to the correspondence between the second optical interface and the logical interface. FIG. 5 shows the modified correspondence. In this case, the first processing module 101 may determine, according to the correspondence between the first optical serial signal flow and the logical interface, the logical interface corresponding to the first optical serial signal flow, the second processing module 102 may determine, according to the correspondence between the logical interface and the second optical interface, the second optical interface corresponding to the logical interface, and the scheduling module 103 may transmit the first optical serial signal flow through the second optical interface.

It may be seen that, a correspondence between a logical interface and an optical interface is modified by modifying the second correspondence table in the foregoing two correspondence tables, to change an optical interface that is used to output an optical serial signal flow. Therefore, the foregoing technical solution may be better applied to a flexible Ethernet.

Preferably, when the second processing module 102 modifies the correspondence between the first optical interface and the logical interface to the correspondence between the second optical interface and the logical interface, the second processing module 102 may further modify the bandwidth of the logical interface. Specifically, the second processing module 102 may modify the bandwidth of the logical interface to second bandwidth, where the bandwidth of the first optical serial signal flow is less than or equal to the second bandwidth.

Preferably, the first processing module 101 may be further configured to modify the correspondence between the first optical serial signal flow and the logical interface to a correspondence between a second optical serial signal flow and the logical interface.

The first processing module 101 may be further configured to determine, according to the correspondence between the second optical serial signal flow and the logical interface, the logical interface corresponding to the second optical serial signal flow.

The second processing module 102 may be further configured to modify the correspondence between the logical interface and the first optical interface to a correspondence between the logical interface and a second optical interface.

The second processing module 102 may be further configured to determine, according to the correspondence between the logical interface and the second optical interface and the logical interface that is determined by the first processing module 101, the second optical interface corresponding to the logical interface.

The scheduling module 103 may be further configured to transmit the second optical serial signal flow through the second optical interface determined by the second processing module 102.

Specifically, when a correspondence between a logical interface and an optical serial signal flow, and a correspondence between the logical interface and an optical interface need to be modified, modifications may be implemented by modifying the foregoing first correspondence table and the second correspondence table.

For example, in the foregoing preferable implementation manners, the first processing module 101 modifies the correspondence between the first optical serial signal flow and the logical interface in the first correspondence table to the correspondence between the second optical serial signal flow and the logical interface. The second processing module 102 modifies the correspondence between the logical interface and the first optical interface in the second correspondence table to the correspondence between the logical interface and the second optical interface. FIG. 6 shows the modified correspondence. In this case, the first processing module 101 determines, according to the correspondence between the second optical serial signal flow and the logical interface, the logical interface corresponding to the second optical serial signal flow, the second processing module 102 determines, according to the correspondence between the logical interface and the second optical interface, the second optical interface corresponding to the logical interface, and the scheduling module 103 transmits the second optical serial signal flow through the second optical interface.

It may be seen that, a correspondence between a logical interface and an optical interface and a correspondence between the logical interface and an optical serial signal flow are modified by modifying the foregoing two correspondence tables, so that a current optical interface and a current optical serial signal flow may be changed. That is, another optical interface is used to output another optical serial signal. Therefore, the foregoing technical solution may be better applied to a flexible Ethernet.

Preferably, when the first processing module 101 modifies the correspondence between the first optical serial signal flow and the logical interface to the correspondence between the second optical serial signal flow and the logical interface, or the second processing module 102 modifies the correspondence between the logical interface and the first optical interface to the correspondence between the logical interface and the second optical interface, the first processing module 101 or the second processing module 102 may further modify the bandwidth of the logical interface. Specifically, the first processing module 101 or the second processing module 102 may be further configured to modify the bandwidth of the logical interface to second bandwidth, where the bandwidth of the second optical serial signal flow is less than or equal to the second bandwidth.

The second optical interface involved in the foregoing embodiment is corresponding to an optical fiber, or a channel that is in an optical fiber and is used to transmit an optical signal with a wavelength, where the second optical interface is different from the first optical interface.

It may be seen from the foregoing description that, in this embodiment of the present invention, a first optical serial signal flow is corresponding to a logical interface, and the logical interface is corresponding to a first optical interface. An optical interface used to output the first optical serial signal flow may be determined according to a correspondence between the first optical serial signal flow and the logical interface and a correspondence between the logical interface and the first optical interface. Therefore, at least one of the foregoing two correspondences may be modified to change an optical serial signal flow that is output by an optical interface or change an optical interface that is used to output an optical serial signal flow. Therefore, the foregoing technical solution may be better applied to a flexible Ethernet.

Referring to FIG. 7, FIG. 7 is a schematic flowchart of a data processing method according to an embodiment of the present invention. The data processing apparatus shown in FIG. 2 may be configured to execute the method shown in FIG. 7. Referring to FIG. 7, the method may include the following steps.

S201: A line card determines, according to a correspondence between a first optical serial signal flow and a logical interface, the logical interface corresponding to the first optical serial signal flow.

Bandwidth of the logical interface is configured to be first bandwidth, bandwidth of the first optical serial signal flow is less than or equal to the first bandwidth, the logical interface is corresponding to a first optical interface, and the first optical interface is corresponding to an optical fiber, or a channel that is in an optical fiber and is used to transmit an optical signal with a wavelength.

S202: The line card determines, according to a correspondence between the logical interface and the first optical interface, the first optical interface corresponding to the logical interface.

S203: The line card transmits the first optical serial signal flow through the first optical interface.

Preferably, the foregoing method further includes: modifying, by the line card, the bandwidth of the logical interface to second bandwidth, where the bandwidth of the first optical serial signal flow is less than or equal to the second bandwidth.

For example, the line card 100 may modify the bandwidth of the logical interface according to a configuration message sent by a network management system or according to a configuration command entered by an engineer by using telnet. Specifically, the bandwidth of the logical interface is modified to the second bandwidth. The line card 100 may modify the configuration information. An identifier of the logical interface and a value of the second bandwidth may be stored in the modified configuration information. The first bandwidth is not equal to the second bandwidth. For example, the first bandwidth may be 25 gigabits per second (Gb/s for short), and the second bandwidth may be 50 Gb/s.

For example, the correspondence between the first optical serial signal flow and the logical interface is stored in the first correspondence table, and the correspondence between the logical interface and the first optical interface is stored in a second correspondence table. The bandwidth of the logical interface is configured to be the first bandwidth, the bandwidth of the first optical serial signal flow is less than or equal to the first bandwidth, the logical interface is corresponding to the first optical interface, and the first optical interface is corresponding to an optical fiber, or a channel that is in an optical fiber and is used to transmit an optical signal with a wavelength. FIG. 3 shows the foregoing correspondences. In this case, the line card 100 may determine, according to the correspondence between the first optical serial signal flow and the logical interface, the logical interface corresponding to the first optical serial signal flow, determine, according to the correspondence between the logical interface and the first optical interface, the first optical interface corresponding to the logical interface, and transmit the first optical serial signal flow through the first optical interface. For example, the wavelength may be 850 nanometers (nm for short), 1310 nm, or 1550 nm.

Specifically, the line card 100 or a network device including the line card boo may store the first correspondence table that is used to store the correspondence between the first optical serial signal flow and the logical interface; and may further store the second correspondence table that is used to store the correspondence between the logical interface and the first optical interface. There is a one-to-one correspondence between the logical interface and the first optical interface. The first optical interface is corresponding to an optical fiber, or a channel that is in an optical fiber and is used to transmit an optical signal with a wavelength. For example, the first correspondence table may include an identifier of the first optical serial signal flow and the identifier of the logical interface, and the second correspondence table may include the identifier of the logical interface and an identifier of the first optical interface. The first optical serial signal flow may be sent by a first SerDes, where the line card 100 includes the first SerDes. The identifier of the first optical serial signal flow may be an identifier of the first SerDes. The line card 100 may generate the first correspondence table and the second correspondence table according to a configuration message sent by a network management system or according to a configuration command entered by an engineer by using telnet. The line card 100 may modify the first correspondence table and the second correspondence table according to a configuration message sent by a network management system or according to a configuration command entered by an engineer by using telnet.

The line card 100 may perform configuration on the bandwidth of the logical interface. For example, the line card 100 may perform configuration on the bandwidth of the logical interface according to a configuration message sent by a network management system or according to a configuration command entered by an engineer by using telnet. For example, the bandwidth of the logical interface is configured to be the first bandwidth. The line card 100 may generate configuration information after the bandwidth of the logical interface is configured, where the identifier of the logical interface and a value of the first bandwidth may be stored in the configuration information. One signal flow of the logical interface may be modulated by a MAC/PCS chip in the line card into one or more electrical serial signal flows, and one electrical serial signal flow may be modulated by an optical modem in the line card into one or more optical serial signal flows, where bandwidth of an optical serial signal flow is less than or equal to bandwidth of a corresponding logical interface.

The line card 100 may establish the first correspondence table and the second correspondence table when performing configuration on the logical interface, or the line card 100 may adjust the first correspondence table and the second correspondence table when adjusting the logical interface, for example, when adjusting a quantity of logical interfaces or adjusting the bandwidth of the logical interface, to meet a requirement of a flexible Ethernet.

Further, the foregoing method further includes: modifying, by the line card, the correspondence between the first optical serial signal flow and the logical interface to a correspondence between a second optical serial signal flow and the logical interface, where bandwidth of the second optical serial signal flow is less than or equal to the first bandwidth; determining, by the line card according to the correspondence between the second optical serial signal flow and the logical interface, the logical interface corresponding to the second optical serial signal flow; and transmitting, by the line card, the second optical serial signal flow through the first optical interface.

The correspondence between the second optical serial signal flow and the logical interface may be implemented by using, for example, a third correspondence table, where the third correspondence table may include an identifier of the second optical serial signal flow and the identifier of the logical interface. The second optical serial signal flow may be sent by a second SerDes, where the line card 100 includes the second SerDes. The identifier of the second optical serial signal flow may be an identifier of the second SerDes.

Specifically, when a correspondence between a logical interface and an optical serial signal flow needs to be modified, a modification may be implemented by modifying the foregoing first correspondence table.

For example, in the foregoing preferable implementation manner, the line card 100 modifies the correspondence between the first optical serial signal flow and the logical interface in the first correspondence table to the correspondence between the second optical serial signal flow and the logical interface, where the bandwidth of the second optical serial signal flow is less than or equal to the first bandwidth. FIG. 4 shows the modified correspondence. In this case, the line card 100 may determine, according to the correspondence between the second optical serial signal flow and the logical interface, the logical interface corresponding to the second optical serial signal flow, determine, according to the correspondence between the logical interface and the first optical interface, the first optical interface corresponding to the logical interface, and transmit the first optical serial signal flow through the first optical interface.

It may be seen that, a correspondence between a logical interface and an optical serial signal flow is modified by modifying the first correspondence table in the foregoing two correspondence tables, to change an optical serial signal flow that is input by an optical interface. Therefore, the foregoing technical solution may be better applied to a flexible Ethernet.

Preferably, in the foregoing technical solution, the method may further include: modifying, by the line card, the bandwidth of the logical interface to second bandwidth, where the bandwidth of the second optical serial signal flow is less than or equal to the second bandwidth.

Preferably, the foregoing method further includes: modifying, by the line card, the correspondence between the logical interface and the first optical interface to a correspondence between the logical interface and a second optical interface; determining, by the line card according to the correspondence between the logical interface and the second optical interface, the second optical interface corresponding to the logical interface; and transmitting, by the line card, the first optical serial signal flow through the second optical interface.

Specifically, when a correspondence between a logical interface and an optical interface needs to be modified, a modification may be implemented by modifying the foregoing second correspondence table.

For example, in the foregoing preferable implementation manner, the line card 100 modifies the correspondence between the first optical interface and the logical interface in the second correspondence table to the correspondence between the second optical interface and the logical interface. FIG. 5 shows the modified correspondence. In this case, the line card 100 may determine, according to the correspondence between the first optical serial signal flow and the logical interface, the logical interface corresponding to the first optical serial signal flow. The line card 100 may determine, according to the correspondence between the logical interface and the second optical interface, the second optical interface corresponding to the logical interface, and transmits the first optical serial signal flow through the second optical interface.

It may be seen that, a correspondence between a logical interface and an optical interface is modified by modifying the second correspondence table in the foregoing two correspondence tables, to change an optical interface that is used to output an optical serial signal flow. Therefore, the foregoing technical solution may be better applied to a flexible Ethernet.

Preferably, in the foregoing technical solution, the method may further include: modifying, by the line card, the bandwidth of the logical interface to second bandwidth, where the bandwidth of the first optical serial signal flow is less than or equal to the second bandwidth.

Preferably, the foregoing method further includes: modifying, by the line card, the correspondence between the first optical serial signal flow and the logical interface to a correspondence between a second optical serial signal flow and the logical interface; modifying, by the line card, the correspondence between the logical interface and the first optical interface to a correspondence between the logical interface and a second optical interface; determining, by the line card according to the correspondence between the second optical serial signal flow and the logical interface, the logical interface corresponding to the second optical serial signal flow; determining, by the line card according to the correspondence between the logical interface and the second optical interface, the second optical interface corresponding to the logical interface; and transmitting, by the line card, the second optical serial signal flow through the second optical interface.

Specifically, when a correspondence between a logical interface and an optical serial signal flow, and a correspondence between the logical interface and an optical interface need to be modified, modifications may be implemented by modifying the foregoing first correspondence table and the second correspondence table.

For example, in the foregoing preferable implementation manners, the line card 100 modifies the correspondence between the first optical serial signal flow and the logical interface in the first correspondence table to the correspondence between the second optical serial signal flow and the logical interface. The line card 100 modifies the correspondence between the logical interface and the first optical interface in the second correspondence table to the correspondence between the logical interface and the second optical interface. FIG. 6 shows the modified correspondence. In this case, the line card 100 determines, according to the correspondence between the second optical serial signal flow and the logical interface, the logical interface corresponding to the second optical serial signal flow, determines, according to the correspondence between the logical interface and the second optical interface, the second optical interface corresponding to the logical interface, and transmits the second optical serial signal flow through the second optical interface.

It may be seen that, a correspondence between a logical interface and an optical interface and a correspondence between the logical interface and an optical serial signal flow are modified by modifying the foregoing two correspondence tables, so that a current optical interface and a current optical serial signal flow may be changed. That is, another optical interface is used to output another optical serial signal. Therefore, the foregoing technical solution may be better applied to a flexible Ethernet.

Preferably, the foregoing method further includes: modifying, by the line card, the bandwidth of the logical interface to second bandwidth, where the bandwidth of the second optical serial signal flow is less than or equal to the second bandwidth.

The second optical interface involved in the foregoing embodiment is corresponding to an optical fiber, or a channel that is in an optical fiber and is used to transmit an optical signal with a wavelength, where the second optical interface is different from the first optical interface.

It may be seen from the foregoing description that, in this embodiment of the present invention, a first optical serial signal flow is corresponding to a logical interface, and the logical interface is corresponding to a first optical interface. An optical interface used to output the first optical serial signal flow may be determined according to a correspondence between the first optical serial signal flow and the logical interface and a correspondence between the logical interface and the first optical interface. Therefore, at least one of the foregoing two correspondences may be modified to change an optical serial signal flow that is output by an optical interface or change an optical interface that is used to output an optical serial signal flow. Therefore, the foregoing technical solution may be better applied to a flexible Ethernet.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of any other programmable data processing device, so that the instructions executed by the computer or the processor of any other programmable data processing device may implement a specific function in one or more procedures in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more procedures in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

It is obvious that persons skilled in the art may make modifications and variations to solutions provided in embodiments of the present invention. The present invention is intended to cover these modifications and variations provided that they fall within the scope of protection defined by the following claims and their equivalent technologies.

What is claimed is:

1. An apparatus, wherein the apparatus is implemented using a line card, and the line card comprises:
   a processor; and
   a computer-readable storage medium storing a program to be executed by the processor, the program including instructions for:
      obtaining a first optical serial signal flow, the first optical serial signal flow being identified by a first identifier of the first optical serial signal flow;
      determining an identifier of a logical interface for the first optical serial signal flow, the identifier of the logical interface being determined using a first correspondence and the first identifier of the first optical serial signal flow, wherein the first correspondence is stored in a correspondence table, and wherein the first correspondence is a correspondence between the first identifier of the first optical serial signal flow and the identifier of the logical interface;
      determining a first optical interface as a transmitting interface of the first optical serial signal flow, wherein the first optical interface is determined using a second correspondence and the identifier of the logical interface, and wherein the second correspondence is a correspondence between the identifier of the logical interface and the identifier of the first optical interface;
      transmitting the first optical serial signal flow through the first optical interface;
      modifying, based on configuration information, the first correspondence to be a third correspondence after the first optical serial signal flow is transmitted through the first optical interface, wherein the third correspondence is a correspondence between a second identifier of a second optical serial signal flow and the identifier of the logical interface;
      obtaining the second optical serial signal flow identified by the second identifier;
      determining, based on the third correspondence, a target optical interface as a transmitting interface of the second optical serial signal flow; and
      transmitting the second optical serial signal flow through the transmitting interface of the second optical serial signal flow.

2. The apparatus of claim 1, wherein the instructions for determining, based on the third correspondence, the target optical interface as the transmitting interface of the second optical serial signal flow comprise instructions for:
   determining the identifier of the logical interface for the second optical serial signal flow using the third correspondence and the second identifier of the second optical serial signal flow; and
   determining, using the second correspondence and the identifier of the logical interface, the first optical interface as the transmitting interface of the second optical serial signal flow.

3. The apparatus of claim 1, wherein the program further comprises instructions for:
   modifying, based on the configuration information, the second correspondence to be a fourth correspondence after the second optical serial signal flow is transmitted through the transmitting interface of the second optical serial signal flow, wherein the fourth correspondence is a correspondence between the identifier of the logical interface and an identifier of a second optical interface; and wherein the instructions for determining, based on the third correspondence, the target optical interface as the transmitting interface of the second optical serial signal flow comprise instructions for:
 determining the identifier of the logical interface for the second optical serial signal flow using the third correspondence and the second identifier of the second optical serial signal flow; and
 determining, using the fourth correspondence, the second optical interface as the transmitting interface of the second optical serial signal flow.

4. An apparatus, wherein the apparatus is implemented using a line card, the line card comprising:
 a processor; and
 a computer-readable storage medium storing a program to be executed by the processor, the program including instructions for:
 obtaining a first optical serial signal flow identified by a first identifier of the first optical serial signal flow;
 determining an identifier of a logical interface for the first optical serial signal flow using a first correspondence and the first identifier of the first optical serial signal flow, wherein the first correspondence is stored in a correspondence table, wherein the first correspondence is a correspondence between the first identifier of the first optical serial signal flow and an identifier of a the logical interface;
 determining, using a second correspondence, a first optical interface as a transmitting interface of the first optical serial signal flow, wherein the first optical interface is determined using the second correspondence and the identifier of the logical interface, wherein the second correspondence is a correspondence between the identifier of the logical interface and the identifier of the first optical interface;
 transmitting the first optical serial signal flow through the first optical interface;
 modifying, based on configuration information, the second correspondence to be a third correspondence after the first optical serial signal flow is transmitted through the first optical interface, the third correspondence being a correspondence between the identifier of the logical interface and an identifier of a second optical interface;
 obtaining a target optical serial signal flow after modifying the second correspondence to be the third correspondence;
 determining, based on the third correspondence, the second optical interface as a transmitting interface of the target optical serial signal flow; and
 transmitting the target optical serial signal flow through the second optical interface.

5. The apparatus of claim 4, wherein the target optical serial signal flow obtained after modifying the second correspondence to be the third correspondence is the first optical serial signal flow; and
 wherein the instructions for determining, based on the third correspondence, the second optical interface as the transmitting interface of the target optical serial signal flow include instructions for:
 determining the identifier of the logical interface for the first optical serial signal flow using the first correspondence and the first identifier of the first optical serial signal flow; and
 determining, using the third correspondence, the second optical interface as the transmitting interface of the first optical serial signal flow.

6. The apparatus of claim 4,
 wherein the target optical serial signal flow obtained after modifying the second correspondence to be the third correspondence is a second optical serial signal flow; and
 wherein the instructions for determining, based on the third correspondence, the second optical interface as the transmitting interface of the target optical serial signal flow include instructions for:
 modifying, based on the configuration information, the first correspondence to be a fourth correspondence after the second correspondence is modified to be a third correspondence, the fourth correspondence being a correspondence between an identifier of the second optical serial signal flow and the identifier of the logical interface;
 determining the identifier of the logical interface using the fourth correspondence and the identifier of the second optical serial signal flow; and
 determining, using the third correspondence, the second optical interface as the transmitting interface of the second optical serial signal flow.

7. A method implemented by an apparatus, comprising:
 obtaining a first optical serial signal flow identified by a first identifier of the first optical serial signal flow;
 determining an identifier of a logical interface for the first optical serial signal flow using a first correspondence and the first identifier of the first optical serial signal flow, wherein the first correspondence is stored in a correspondence table, wherein the first correspondence is a correspondence between the first identifier of the first optical serial signal flow and an identifier of the logical interface;
 determining, using a second correspondence, a first optical interface as a transmitting interface of the first optical serial signal flow, wherein the first optical interface is determined using the second correspondence and the identifier of the logical interface, wherein the second correspondence is a correspondence between the identifier of the logical interface and the identifier of the first optical interface;
 transmitting the first optical serial signal flow through the first optical interface;
 modifying, based on configuration information, the first correspondence to be a third correspondence after the first optical serial signal flow is transmitted through the first optical interface, wherein the third correspondence is a correspondence between a second identifier of a second optical serial signal flow and the identifier of the logical interface;
 obtaining the second optical serial signal flow identified by the second identifier of the second optical serial signal flow;
 determining, based on the third correspondence, a target optical interface as a transmitting interface of the second optical serial signal flow; and
 transmitting the second optical serial signal flow through the transmitting interface of the second optical serial signal flow.

8. The method of claim 7, wherein determining, based on the third correspondence, the target optical interface as a transmitting interface of the second optical serial signal flow comprises:
 determining, using the third correspondence, the identifier of the logical interface for the second optical serial signal flow using the second identifier of the second optical serial signal flow; and determining, using the second correspondence, the first optical interface as the transmitting interface of the second optical serial signal flow.

9. A method implemented by an apparatus, the method comprising:
   obtaining a first optical serial signal flow, the first optical serial signal flow being identified by a first identifier of the first optical serial signal flow;
   determining an identifier of a logical interface for the first optical serial signal flow wherein the identifier of the logical interface for the first optical serial signal flow is determined using a first correspondence and the first identifier of the first optical serial signal flow, wherein the first correspondence is stored in a correspondence table, and wherein the first correspondence is a correspondence between the first identifier of the first optical serial signal flow and an identifier of a the logical interface;
   determining, using a second correspondence, a first optical interface as a transmitting interface of the first optical serial signal flow, wherein the first optical interface is determined from the second correspondence using the identifier of the logical interface, and wherein the second correspondence is a correspondence between the identifier of the logical interface and the identifier of the first optical interface;
   transmitting the first optical serial signal flow through the first optical interface;
   modifying, based on configuration information, the second correspondence to be a third correspondence after the first optical serial signal flow is transmitted through the first optical interface, wherein the third correspondence is a correspondence between the identifier of the logical interface and an identifier of a second optical interface;
   obtaining a target optical serial signal flow after modifying the second correspondence to be the third correspondence;
   determining, based on the third correspondence, the second optical interface as a transmitting interface of the target optical serial signal flow; and
   transmitting the target optical serial signal flow through the second optical interface.

10. The method of claim 9, wherein the target optical serial signal flow is the first optical serial signal flow, and
   wherein determining, based on the third correspondence, the second optical interface as the transmitting interface of the target optical serial signal flow comprises:
      determining, using the first correspondence and the first identifier of the first optical serial signal flow, the identifier of the logical interface for the first optical serial signal flow; and
      determining, using the third correspondence, the second optical interface as the transmitting interface of the first optical serial signal flow.

* * * * *